(12) United States Patent
Bartel (10) Patent No.: US 8,365,849 B2
(45) Date of Patent: Feb. 5, 2013

(54) SYSTEM AND METHOD FOR TOWING A TRAILER

(76) Inventor: Brian Daniel Bartel, Green Bay, WI (US)

( * ) Notice: Subject to any disclaimer, the term of this patent is extended or adjusted under 35 U.S.C. 154(b) by 361 days.

(21) Appl. No.: 12/856,685

(22) Filed: Aug. 16, 2010

(65) Prior Publication Data

US 2011/0042154 A1 Feb. 24, 2011

Related U.S. Application Data

(60) Provisional application No. 61/235,352, filed on Aug. 19, 2009.

(51) Int. Cl.
*B60T 7/20* (2006.01)
(52) U.S. Cl. ........ 180/14.2; 180/14.6; 180/6.5; 303/146
(58) Field of Classification Search .................. 180/14.1, 180/14.2, 14.6, 6.48, 6.5; 303/146
See application file for complete search history.

(56) References Cited

U.S. PATENT DOCUMENTS

| | | | |
|---|---|---|---|
| 3,826,324 A * | 7/1974 | Stevens | 180/6.5 |
| 4,023,864 A | 5/1977 | Lang et al. | |
| 4,199,037 A | 4/1980 | White | |
| 4,269,280 A | 5/1981 | Rosen | |
| 5,988,000 A | 11/1999 | Adams | |
| 6,390,215 B1 | 5/2002 | Kodama et al. | |
| 6,516,925 B1 | 2/2003 | Napier et al. | |
| 6,705,684 B1 | 3/2004 | Garvey | |
| 6,725,955 B2 | 4/2004 | Bidwell | |
| 7,147,070 B2 | 12/2006 | Leclerc | |
| 7,743,859 B2 * | 6/2010 | Forsyth | 180/65.1 |
| 8,165,770 B2 * | 4/2012 | Getman et al. | 701/70 |
| 8,215,436 B2 * | 7/2012 | DeGrave et al. | 180/165 |
| 8,297,384 B2 * | 10/2012 | Wanger et al. | 180/14.2 |
| 2004/0006414 A1 | 1/2004 | Suzuki | |
| 2008/0023234 A1 | 1/2008 | Wang | |
| 2012/0061154 A1 * | 3/2012 | Pfister | 180/14.2 |

* cited by examiner

*Primary Examiner* — Kevin Hurley
(74) *Attorney, Agent, or Firm* — Steven H Greenfield; Greenfield Invention and Patent Consulting, Inc.

(57) ABSTRACT

Systems for towing a trailer by a towing vehicle and a method for controlling such a system are disclosed. The systems and method are configured to maintain a constant towing load on the towing vehicle as well as optimizing other performance criteria such as fuel efficiency. The system comprises a closed loop controller, a towing arm assembly, a load measuring device, an electric hub motor, brakes, a motor controller and a brake controller disposed on the trailer. In another embodiment, two separate systems are installed, one on each side of the trailer. A load force feeds into a PID controller programmed with preset proportional, differential and integral parameters. The PID controller generates a command signal to either modulate the brakes or motor up or down depending on the sign of the command signal. A process output updates the system which continuously adjusts based on driving conditions.

16 Claims, 8 Drawing Sheets

SYSTEM AND METHOD FOR TOWING A TRAILER

RELATED APPLICATIONS

This application claims priority from provisional application No. 61/235,352 filed on Aug. 19, 2009.

FIELD OF THE INVENTION

The present invention generally relates to a system for towing a motorized trailer by a towing vehicle and a method for optimizing the performance of a vehicle towing a motorized trailer. The towing vehicle may be a car, a truck, a motorcycle or a bicycle. More specifically, the present invention relates to a control system and an algorithm for setting and maintaining an optimum towing load of a bicycle towing a trailer containing one or more an electrical hub motors.

BACKGROUND OF THE INVENTION

Towing a trailer often places a significant drag on the towing vehicle which could result in diminishing the power available for other needed functions such as steering and climbing steep hills as well as result in decreased fuel efficiency. Likewise, for a bicycle towing a trailer, the load exerted by the trailer may exhaust a bicyclist climbing a steep hill which could compromise his or her ability to safely steer the bicycle. This problem is most acute for electric cars or hybrid electric vehicles towing a heavy trailer as they are more power limited than combustion engine vehicles. Another serious issue that may be encountered is an uncontrollable yawing of the trailer from side to side potentially resulting in jackknifing of the trailer.

A variety of solutions are offered in prior art references for controlling various aspects of towing a vehicle. U.S. Pat. No. 4,023,864 discloses an automatic stability control system which senses the lateral acceleration of a vehicle by way of strain gauge sensors, or the like, to provide lateral acceleration signals to an amplifier. U.S. Pat. No. 4,269,280 is for a propulsion apparatus including a prime mover and a secondary, or auxiliary, mover, which is controlled so as to achieve efficient use of energy resources. For battery powered prime movers, the disclosed invention causes the battery to be discharged in the more efficient, low current drain manner as much as possible. To accomplish this objective, the control signal to the secondary mover can be such that, for low current drains, the prime mover battery supplies all of the power but that above a certain predetermined threshold current drain from the battery, the secondary mover begins supplying power in such amounts as to reduce the current utilization of the prime mover to the predetermined threshold level. U.S. Pat. No. 5,988,000 relates to a system and method for measuring the strain forces on a load bearing member having a top surface, a bottom surface, a right surface and a left surface. U.S. Pat. No. 6,516,925 discloses a system for use on a trailer. The system includes a motor controller, a pair of electric motor/generators, a battery, a battery controller, and sensors. The battery controller monitors the yaw rate of trailer. Based upon the monitored yaw rate, the controller selectively activates the motor/generators which provide a regenerative braking torque to the axle assembly thereby applying braking force to the trailer and generating electrical energy which may be used to recharge battery. U.S. Pat. No. 6,705,684 describes a tow ball mounted to a bracket by means of a spacer which incorporates transducers to provide signals indicating forces existing between the towing vehicle and the trailer. A control system is described which is operable to apply braking to the trailer to modify the trailer behavior independently of operation of the vehicle brakes by the operator. U.S. Pat. No. 6,725,955 refers to a two wheeled trailer is used to propel a two wheeled vehicle such as a bicycle or a scooter. The trailer is powered by an electric motor and at least one battery. The control of the motor is through a potentiometer attached to the handlebars of the vehicle and in electrical communication with a controller. The trailer is attached to the vehicle by an attachment arm that is mounted near the rear axle of the vehicle. A coupler that allows three axes of rotation attaches the trailer to the vehicle. U.S. Pat. No. 4,199,037 teaches an electrically-powered vehicle which includes an automobile body and frame that carries an electric motor, a battery and a removable trailer which carries a combustion engine and a generator and which is towed by the automobile body and frame. The vehicle can be operated with the trailer member attached and the motor powered by the parallel combination of the battery and generator, or, alternatively, with the trailer member removed and the motor powered for limited distances by the battery alone. U.S. Pat. No. 6,390,215 provides for an electric vehicle that includes a main battery mounted on a vehicle body and a sub-battery detachably connected to the vehicle body. The electric vehicle travels with the electric power of the main battery in the case where the traveling distance is not long. In the case where the traveling distance is long, a trailer with the sub-battery is coupled to the rear of the electric vehicle, so that both the electric powers of the two batteries are used to drive an electric motor to allow the electric vehicle to travel. U.S. Pat. No. 7,147,070 discloses an improved tractor trailer having a tractor unit and a trailer unit in which the tractor unit includes an internal combustion engine. The improvement comprises an electrical drive arranged to drive at least some of the wheels on at least one of the axles of the trailer, in a control system associated therewith. The arrangement provides extra power for situations where it is required and can, in the case of electric drive motors mounted directly on the wheel, provide for better braking. US Pre-grant publication number 20080023234 relates to a two-wheeled trailer attached to a human powered vehicle such as a bicycle or a scooter for carrying load such as children. The trailer is powered by two electric motors and at least one battery. The control of the motor is through a force/pressure meter inserted to the attachment arm between the two wheel vehicle and the trailer. The attachment arm, on the vehicle side is mounted near the rear axle of the vehicle. A coupler that allows free rotation attaches the trailer to the vehicle.

As can be seen, the prior art does not generally deal with controlling and optimizing the performance of a vehicle towing a trailer as it relates to such criteria as providing power when needed, maintaining a constant towing load, fuel efficiency and the issue of trailer swaying from side to side.

SUMMARY OF THE PRESENT INVENTION

The present invention provides systems and a method for optimizing the performance of a vehicle towing a trailer consistent with certain predetermined criteria. For example, a bicyclist may want to insure that the trailer does not exert a load onto the bicycle at all times, or that he or she experiences a zero trailer load only when climbing a particularly steep hill. Likewise the driver of a hybrid vehicle towing a trailer may want to insure that the drag exerted on the vehicle does not exceed a certain predetermined threshold or that fuel efficiency is maximized. Embodiments of the present invention relate to a control system for a bicycle towing a trailer; however other similar embodiments may apply to combustion, electric or hybrid engines powering a vehicle towing a trailer.

Embodiments of the present invention include controlling the electric hub motors and brakes of the trailer separately, a towing arm assembly that virtually eliminates load measurement errors due to side movements of the trailer and using two closed-loop controllers for each side of the trailer. These features help prevent and/or correct a potentially dangerous situation that may develop in the course of towing a trailer, in which the trailer yaws uncontrollably from side to side.

In one aspect of the present invention, a system for towing a trailer by a towing vehicle, the trailer comprising a first side containing at least one wheel and a second side containing at least one wheel, the system comprises: at least one electric hub motor, with each electric hub motor being adapted for turning one wheel of the trailer, the electric hub motor being powered by at least one battery disposed in the trailer; a towing arm assembly engaged with the trailer at one end and the towing vehicle at another end, the towing arm assembly being adapted for transmitting a mechanical load from the towing vehicle to the trailer; a brake system adapted for applying a breaking force to the wheel; a closed-loop controller disposed on the trailer, the controller being adapted for receiving and processing signals, the closed-loop controller comprising a summing junction, a logic control unit and a process controller; and a load measuring device mounted on the towing arm assembly, the load measuring device being adapted for measuring and summing mechanical forces, the load measuring device also being adapted for transmitting a mechanical force to the logic control unit.

In another aspect of the present invention, a system for towing a trailer by a towing vehicle, the trailer comprising a first side and a second side, with each of the first side and of the second side of the trailer comprises: at least one wheel; at least one electric hub motor, each electric hub motor being adapted for turning one wheel of the trailer, the electric hub motors being powered by at least one battery disposed in the trailer; a load measuring device support assembly having a front arm and a rear arm, the rear arm of the load measuring device support assembly being engaged with the trailer, the load measuring device support assembly being adapted for containing a load measuring device; a brake system adapted for receiving command signals and for applying a breaking force to the wheel; a closed-loop controller, the controller being adapted for receiving and processing signals, the closed-loop controller comprising a summing junction, a logic control unit and a process controller; a load measuring device disposed on the load measuring device support assembly, the load measuring device being adapted for measuring and summing mechanical loads, the load measuring device also being adapted for transmitting a mechanical force to the logic control unit; the system also comprising a joining bar attached at one end to the front arm of the load measuring device support assembly of the first side of the trailer, the joining bar being attached at another end to the front arm of the load measuring device support assembly of the second side of the trailer, the system also containing a hitch bar attached at one end to the joining bar and to the towing vehicle at another end.

In yet another aspect of the present invention, a method for controlling the operation of a system for towing a trailer by a towing vehicle, the trailer containing at least two wheels, the method comprising: obtaining a towing load force; generating a command signal from the towing load force and computing a sign for the command signal; if the sign of the command signal is negative, transmitting an increasing brake modulation signal; if the sign of the command signal is positive, transmitting an increasing motor throttle modulation signal; generating a process output, the process output being in a form of torque; converting the torque into a linear mechanical force; combining the linear mechanical force with the towing load force; and generating a revised command signal.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention relates to a system of a motorized vehicle trailer being towed by a towing vehicle using a towing arm assembly. The trailer has at least two wheels, one on each side; however having three or more wheels also falls within the scope of the present invention. At least one electric hub motor is adapted for turning one wheel; however more than one wheel may be equipped with an electric hub motor. Likewise the trailer is equipped with a brake system comprising at least one brake. The brake may be mechanical or regenerative, or a combination of the two. The electric hub motors and brake system are configured for modulation, i.e., for ramping up and down.

The operation of the system is controlled by a closed-loop controller that comprises a logic control unit, a summing junction and a process controller. The logic control unit comprises a proportional calculator, a differential calculator and an integral calculator. A load measuring device is mounted onto the towing arm assembly. The load measuring device is configured to continuously measure the towing load exerted on the towing vehicle by the trailer as well as other forces acting on the trailer. As such, the load measuring device readings also account for disturbances that affect the trailer and the towing vehicle such as the wind and bumpy rides due to potholes. Appropriate load measuring devices may include but are not limited to load cells, strain gauges and displacement transducers. The output of the load measuring device is voltage proportional to the force exerted on the device if the device is a load cell, proportional to deformation if the device is a strain gauge and proportional to displacement if the device is a displacement transducer. In an embodiment of the present invention, the load measuring device comprises an S-shaped load cell.

In a preferred embodiment of the present invention, the towing arm assembly comprises a front bar attached to the towing vehicle and a rear bar attached to the trailer. The load cell is mounted and attached to the front bar and attached to the rear bar by means of a shaft. The sides of the front bar and rear bar are linked to two hard plates, each placed at a side of the front and rear bars. This mounting configuration of the load measuring zeroes out the effect of lateral forces on the load measuring device which may cause errors in the towing load readings as well as cause damage to the load cell.

The mechanical force generated by the load measuring device in the form of voltage is processed by the logic control unit which generates a command signal that may have either a positive or a negative sign. A negative command signal is transmitted to the brake controller with a command to increase brake modulation. A positive command is transmitted to the motor controller to increase motor modulation. The resulting torque generated at the wheel is transmitted to the summing junction and added to the towing load and disturbance forces to produce a deviation force that is fed into the logic control unit. Thus the voltage fed into the logic control unit is continually updated and constant adjustments to wheel speed and extent of braking are made to maintain a desired level of performance.

Embodiments of the present inventions may relate to trucks hauling a large trailer, an automobile towing a U-Haul trailer or a bicycle pulling a load on wheels behind it.

It is an object of the present invention to provide a control process for reducing the towing burden on towing vehicles. For motor vehicles, a trailer of safe weight could be self-powered to improve gas mileage of the towing vehicle. A gas-guzzling towing vehicle and trailer could essentially become a hybrid electric vehicle through the use of this invention. It is also an object of the present invention to improve vehicle safety. Reducing or eliminating towing force would greatly reduce the demand on the vehicle's driving wheels, making spinouts less likely and improving overall traction. Additionally, if the trailer exerts a heavy load on the towing vehicle, the towing vehicle may not have sufficient power to pull the trailer under certain road conditions such as a steep uphill or rough terrain. Increasing the size of the towing vehicle motor to enable pulling trailers under all road conditions decreases fuel efficiency and is therefore undesirable. Likewise, bicycling with a heavy trailing load is typically comfortable under normal road conditions, but may require extreme exertion when riding uphill or into a head wind. The present invention solves this problem by installing a motor system on the trailer that is throttled up and down by a controller that is continuously monitoring towing force. The motor system drives the trailer wheels thereby reducing the load on the towing vehicle.

The preferred embodiment for the motor system is at least one electrical hub motor and may contain one hub motor installed on each wheel; however gasoline and hybrid motors also fall within the scope of the present invention. The present invention also comprises a control system for the trailer motors which throttles the trailer motor system up and down depending on the load exerted on the towing vehicle by the trailer.

In an embodiment of the present invention, the control system comprises a load measuring device, a summing junction, a logic control unit and a process controller that encompasses a motor controller and a brake controller. The preferred embodiment for the logic control unit is a PID controller.

The initial input into the summing junction at the start of the system operation is the load reading from the load measuring device. The input incorporates the initial towing load and any disturbances that may affect the reading such as a bump in the road and wind resistance. This input feeds into the summing junction and then feeds into the logic control unit which separates the deviation force into three separate paths for three separate operations. The P-path multiplies a preset constant, a P gain, by the deviation force. The I-path calculates the integral of the deviation force and multiplies it by the preset I gain. The D-path calculates the derivative of the deviation force and multiplies it by the D gain. The proportional and derivative values are generated instantaneously while the integral values used in the calculations are cumulative. Therefore, the integral value of the initial input will be set to zero. These three paths are then added back together and presented to the motor or brakes system as a command signal. The logic control unit is configured to keep track of run data and compute instantaneous changes for derivative calculations as well as calculating the appropriate areas under the curves for integral calculations.

The command signal may be positive or negative. Under certain road conditions, such as driving downhill, the trailer may be exerting pushing force on the towing vehicle. This could create a hazardous driving condition and one that must be corrected. A condition by which the trailer is exerting a pushing force on the towing vehicle is interpreted by the summing junction as a negative force, i.e., a force having a negative sign. The logic control unit processes a negative signal by feeding it into the brake controller with a command to increase the brake force to an extent depending on signal magnitude. A negative signal bypasses the motor controller and therefore the motor will be idle. A positive signal means that the load on the towing vehicle is higher than optimal and the command is therefore sent to the motor controller with instructions to modulate up the speed to an extent depending on the magnitude of the signal. A positive command sign bypasses the brake controller and the brakes will therefore not be engaged. While the response of the regenerative brakes is instantaneous, a separate logic signal to the brake controller may be necessary, however, to disengage the mechanical portion of the brakes if the brake system is a combination of both mechanical and regenerative braking.

In response to either the brake controller or motor controller, the trailer wheels with either slow down or speed up. This produces a process output that is fed to the summing junction in the form of a force for the next iteration of the control process where it is combined with the towing load force and disturbance force as measured by the load measuring device. When the system operates at steady state, the process output force and the load readings are equal and nullify each other producing a command signal equal to zero. This process is very fast and is configured to continue for as long as towing action takes place. The system is tuned properly when the three P, I, and D gains are set properly to avoid overshoots, oscillations, and long-term errors. The P, I, and D gain parameters are generally established by trial and error. Multiple P, I, and D gain parameter sets may be determined for various systems and objectives as well as the type of PID controller used. For example, a system of a semi-tractor hauling a heavy trailer and attempting to optimize fuel efficiency may be optimized by one set of parameters while a bicycle towing a light trailer will likely be optimized by a different set of P, I and D gain parameters.

Another aspect of the invention is the prevention of trailer yawing from side to side which can create an unsafe condition for the driver. In another embodiment of the present invention, each side of the trailer comprises a separate closed-loop controller including a separate motor controller and brake controller. This system provides enhanced sensitivity to detecting a yawing situation and reacting to it more quickly, thereby improving the probability of preventing it.

In the preferred embodiment of the present invention, the trailer motor and brake system are powered by rechargeable lithium ion batteries; however lead acid and alkaline batteries also fall in the context of the present invention. Also included in the embodiments of the present invention are a manual override of the trailer control system that may be activated from the towing vehicle and a dual charge system for the trailer batteries from both the trailer motor system and the vehicle motor.

Figure 1:
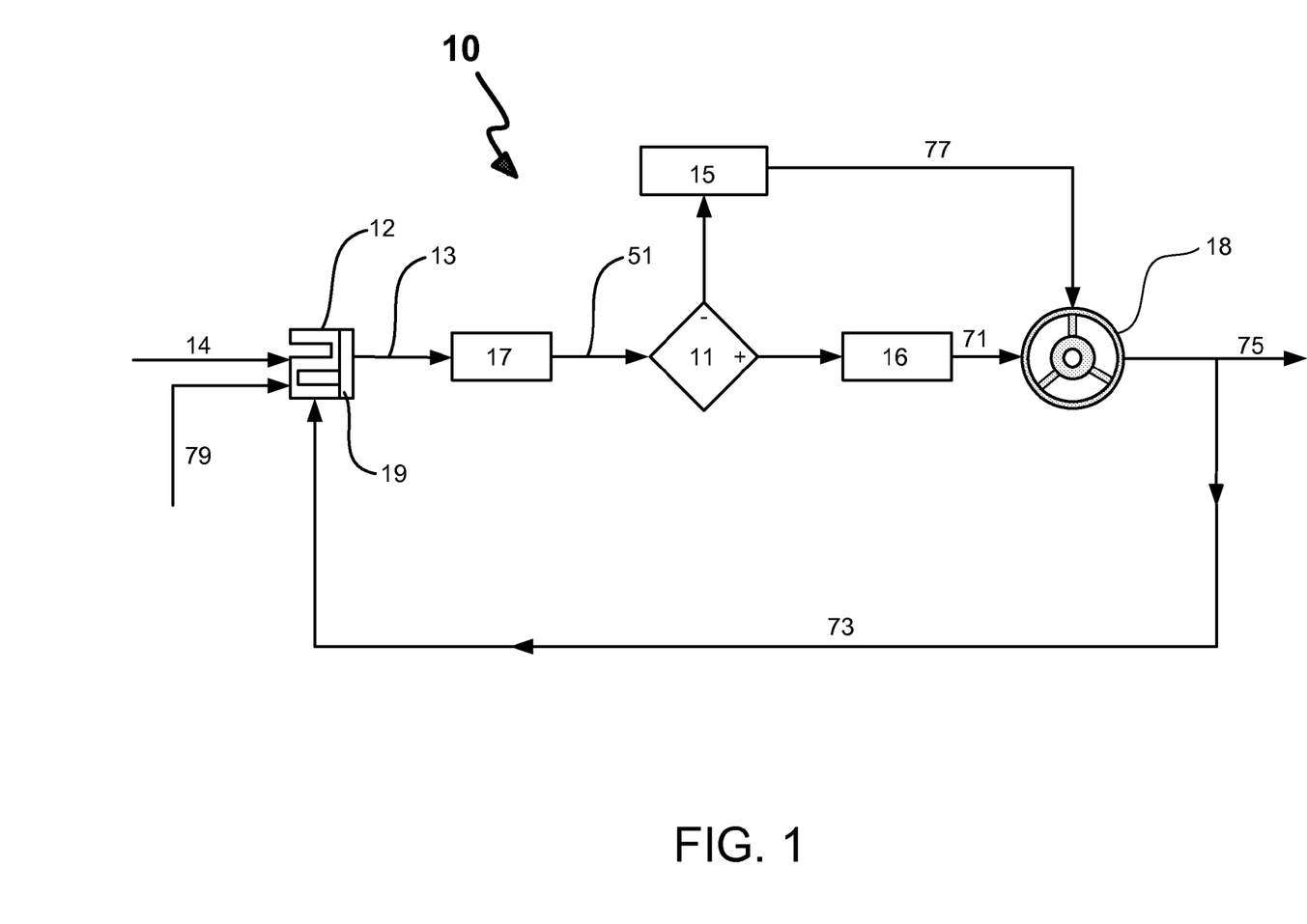
FIG. 1 is a flow chart schematic of the closed-loop controller of a system for towing a trailer by a towing vehicle according to an embodiment of the present invention.

Referring to FIG. 1, there is shown a schematic of the closed-loop controller 10, comprising an S-type load cell 12 into which the towing load force 14, forces stemming from disturbances such as due to wind and road bumps 79, and a process output 73 are fed. These forces are added up in summing junction 19 producing a deviation force 13 that is in turn fed into PID controller 17 in the form of a voltage value proportional to the deviation force 13. The PID controller 17 generates a command signal 51 that is routed at decision point 11 depending on whether the sign is positive or negative. A negative sign routes the signal to the brake controller 15, while a positive sign routes the signal to the motor controller 16. The brake controller 15 produces a signal 77 to apply the brakes to the wheel 18 if signal 51 is negative, while the motor controller 16 transmits a signal 71 to throttle up the wheel 18 if signal 51 is positive. The resulting wheel torque output 75 is fed into the load cell 12 in the form of a process output force 73 that will be summed up in a next iteration by the summing junction 19 to produce an updated deviation force 13. In a situation where the trailer pushes onto the towing vehicle, the process output force 73 is interpreted by the load cell as having a negative sign which in the next iteration creates a negative command signal that engages the brakes to an extent that causes the trailer to slow down sufficiently to restore force equilibrium.

Figure 2:
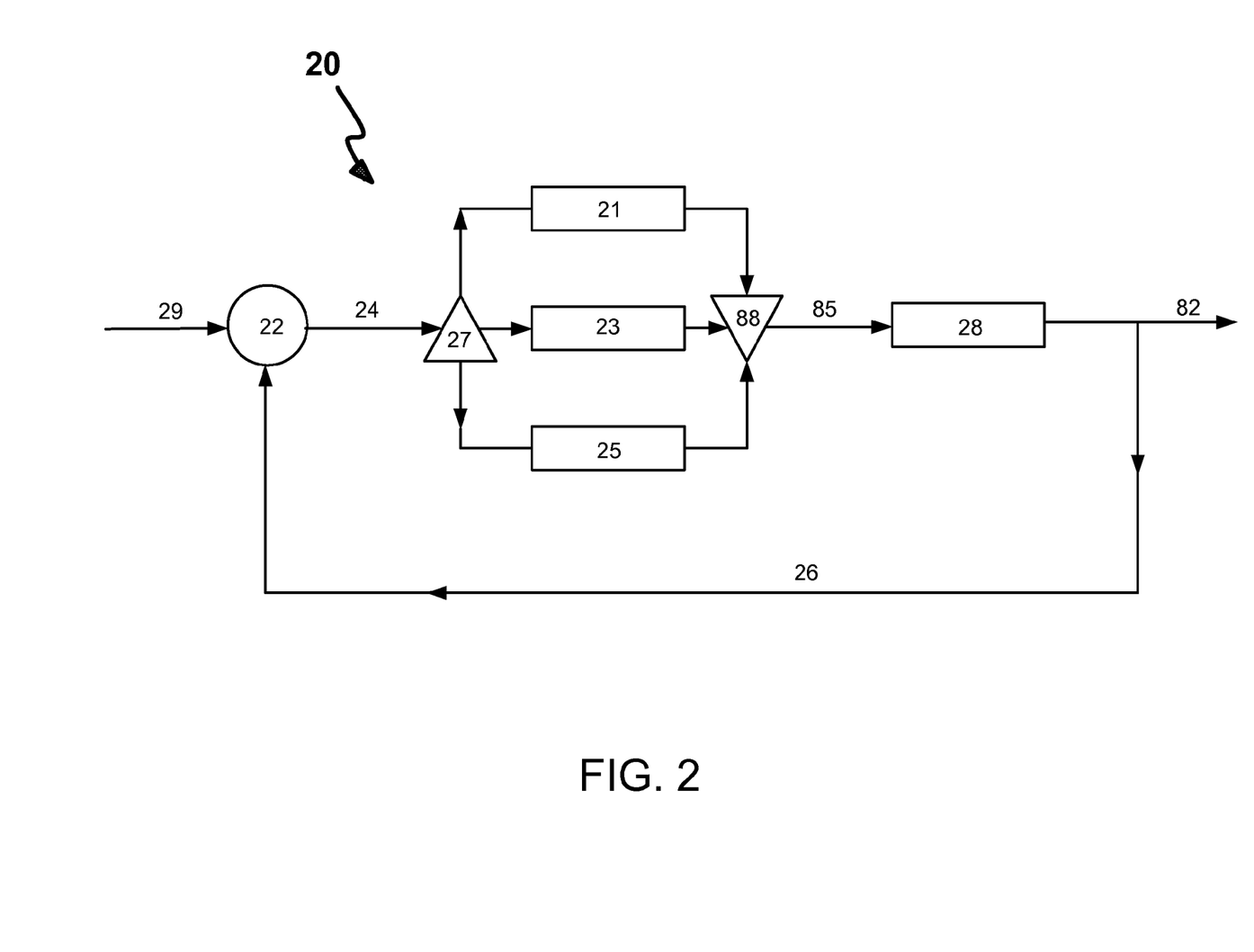
FIG. 2 is a flow chart schematic of the logic control unit component of the closed-loop controller according to an embodiment of the present invention.

FIG. 2 shows the PID controller portion 20 of the closed loop controller. Input forces comprising of the trailer load and disturbances 29 are fed into summing junction 22 resulting in deviation force 24 that enters the PID controller in the form of voltage at a split junction 27. The signal is processed by proportional calculator 21, integral calculator 23 and derivative calculator 25. The processed signals are combined at combining junction 88. Command signal 85 maybe fed to the process controller 28, from which torque output 82 and force output 26 are generated. The force output results from the wheel where the torque is generated travelling a set distance according to the formula:

$F = T/d$, where T denotes torque, F denotes force, and d denotes distance. The force component is picked up by the load cell and sent to the summing junction.

Force output 26 is added to input forces 29 by the summing junction 22 to produce an updated deviation force 24 for the next process iteration.

Figure 3:
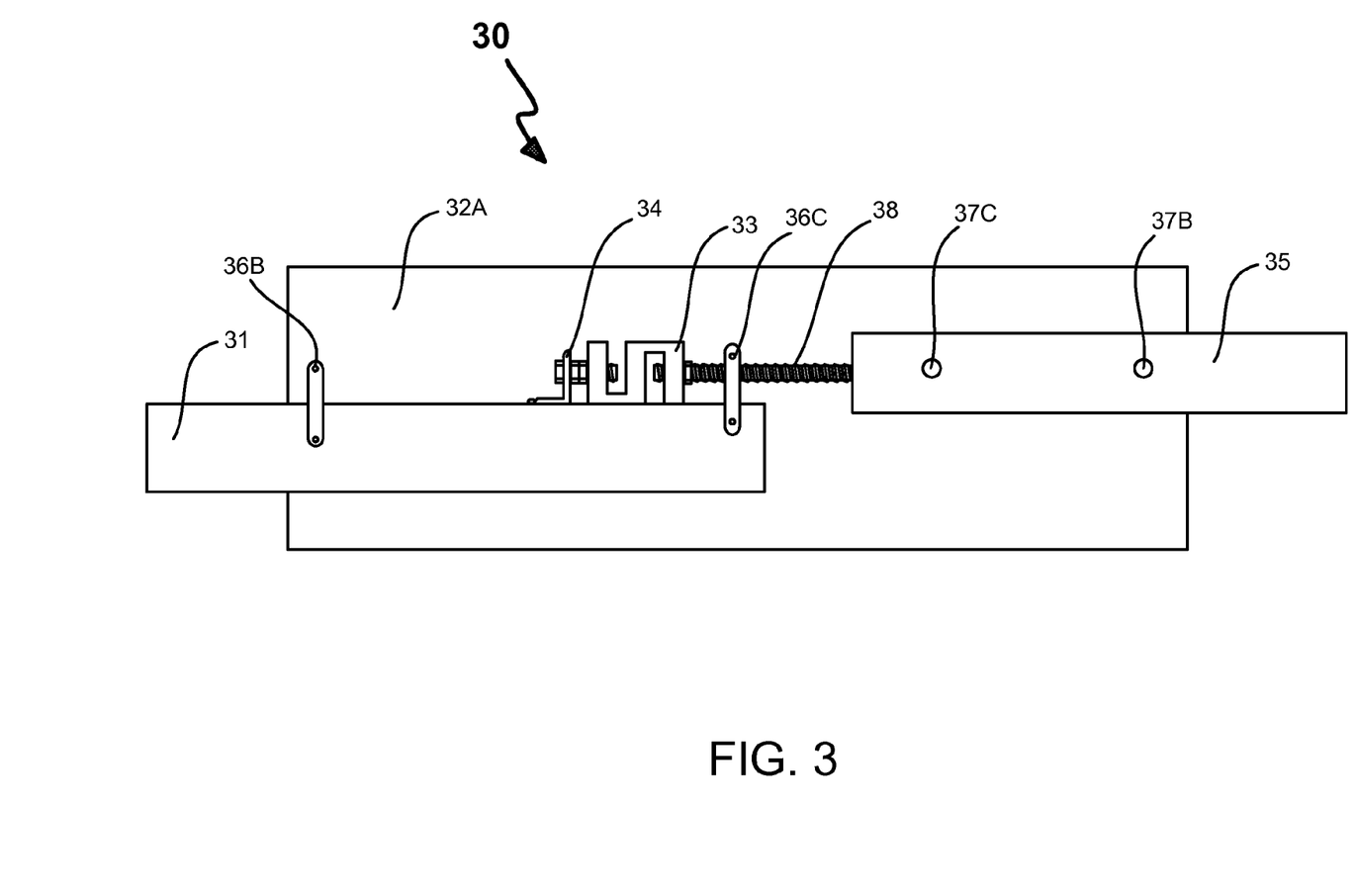
FIG. 3 is a side cutout view of a towing arm assembly according to an embodiment of the present invention.
Figure 3A:
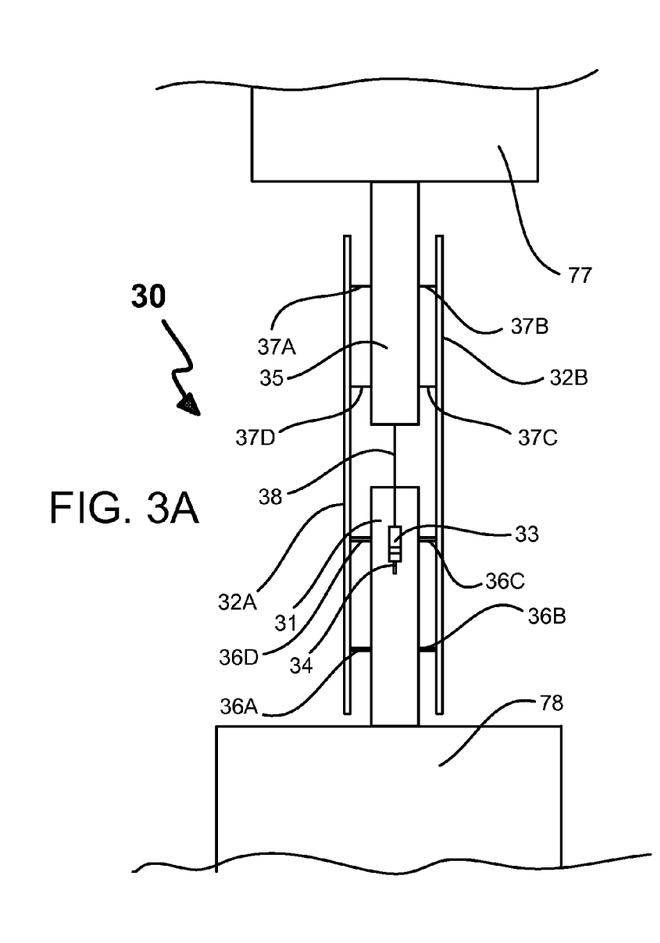
FIG. 3A illustrates a top view of a towing arm assembly according to an embodiment of the present invention.
Figure 3B:
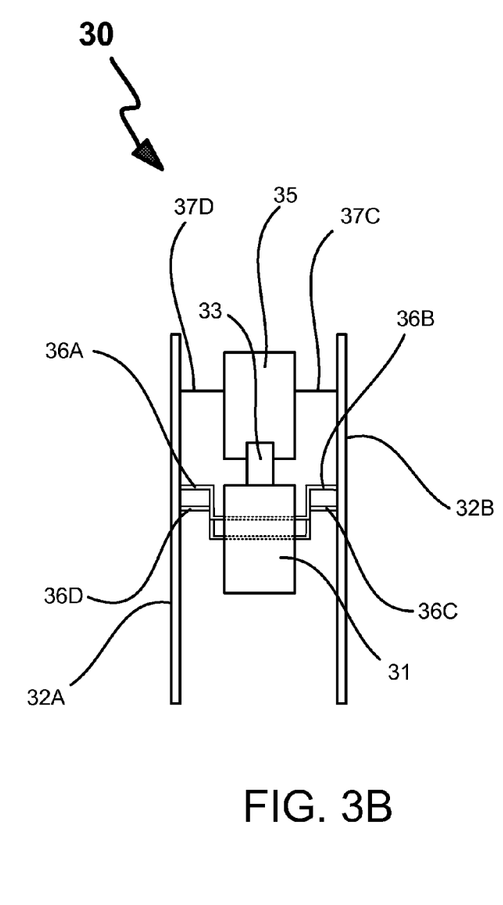
FIG. 3B illustrates a front view of a towing arm assembly according to an embodiment of the present invention.

A towing arm assembly 30 and mounting embodiment of the load cell 33 is shown in FIGS. 3, 3A and 3B. In this embodiment, an S-shaped load cell 33 is mounted on a front bar 31 and connected by a shaft 38 to the front portion of a rear bar 35. The rear portion of the rear bar is linked to the trailer 77. The front portion of the front bar 31 is linked to the towing vehicle 78. The S-shaped load cell 33 is mounted onto the front bar 31 by bracket 34. The shaft 38 connects to a front portion of the rear bar 35 at one end and is threaded onto the bottom of the "S" portion of the load cell 33 at the other end.

Two hard plates, 32A and 32B are positioned on each side of the towing arm assembly 30. A first side of the rear bar 35 is affixed in a permanent fashion to its corresponding plate through bolts 37A and 37D while the second side of the rear bar 35 is affixed in a permanent fashion to its corresponding plate through bolts 37B and 37C. The front bar 31 is pivotally affixed to the two plates by a front pivoting axle having connecting arms 36D and 36C respectively, and a rear pivoting axle having connecting arms 36A and 36B respectively. In this embodiment of the present invention, the rear pivoting axle is positioned at an elevation relative to the front pivoting axle.

Linking the front bar 31 to the hard plates 32A and 32B pivotally permits movement of the front bar 31 relative to the plate and relative to the rear bar, and permits transmission of linear tension forces to the load cell 33 for appropriate force measurements to take place. However, bending forces that may cause errors in the measurements as well as potential damage to the load cell 33 are blocked from having any effect. The hard plate may be made of steel or other hard materials such as wood or plastic.

Figure 4:
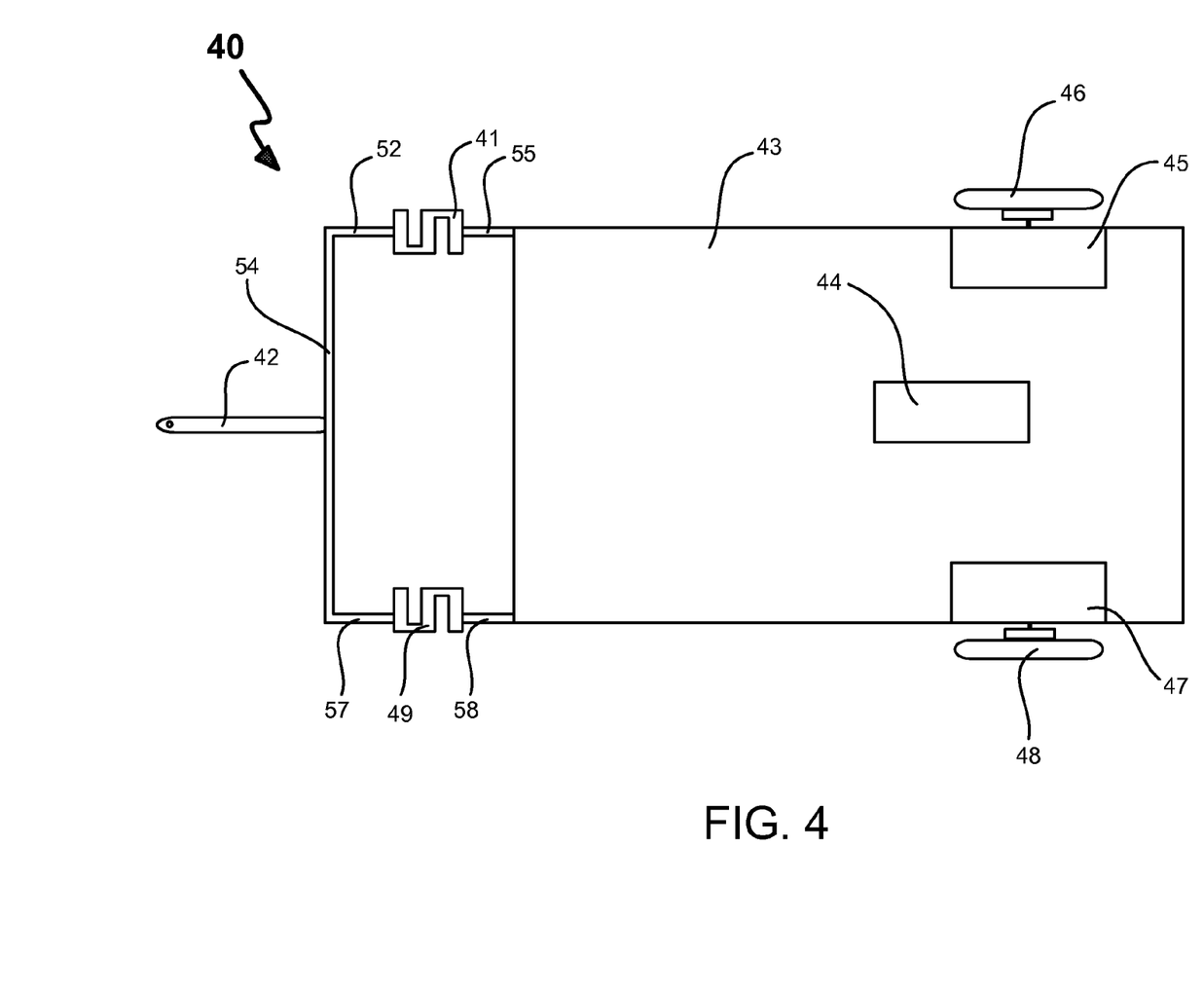
FIG. 4 illustrates a system of towing a trailer having two closed-loop controllers on each side of the trailer according to an embodiment of the present invention.

FIG. 4 portrays a trailer 43 viewed from the top having two wheels 46 and 48 driven by electric hub motors 45 and 47 respectively and two separate closed-loop controllers; one on each side of the trailer. Two S-type load cells 41 and 49 mounted on a load measuring device support assemblies having rear arms 55 and 58 and front arms 52 and 57 respectively. A joining bar 54 connects to the front arms of the load measuring device support assemblies. A towing vehicle hitch bar 42 is attached to about the center of the joining bar thereby forming a towing assembly for a two-controller system 40.

Figure 5:
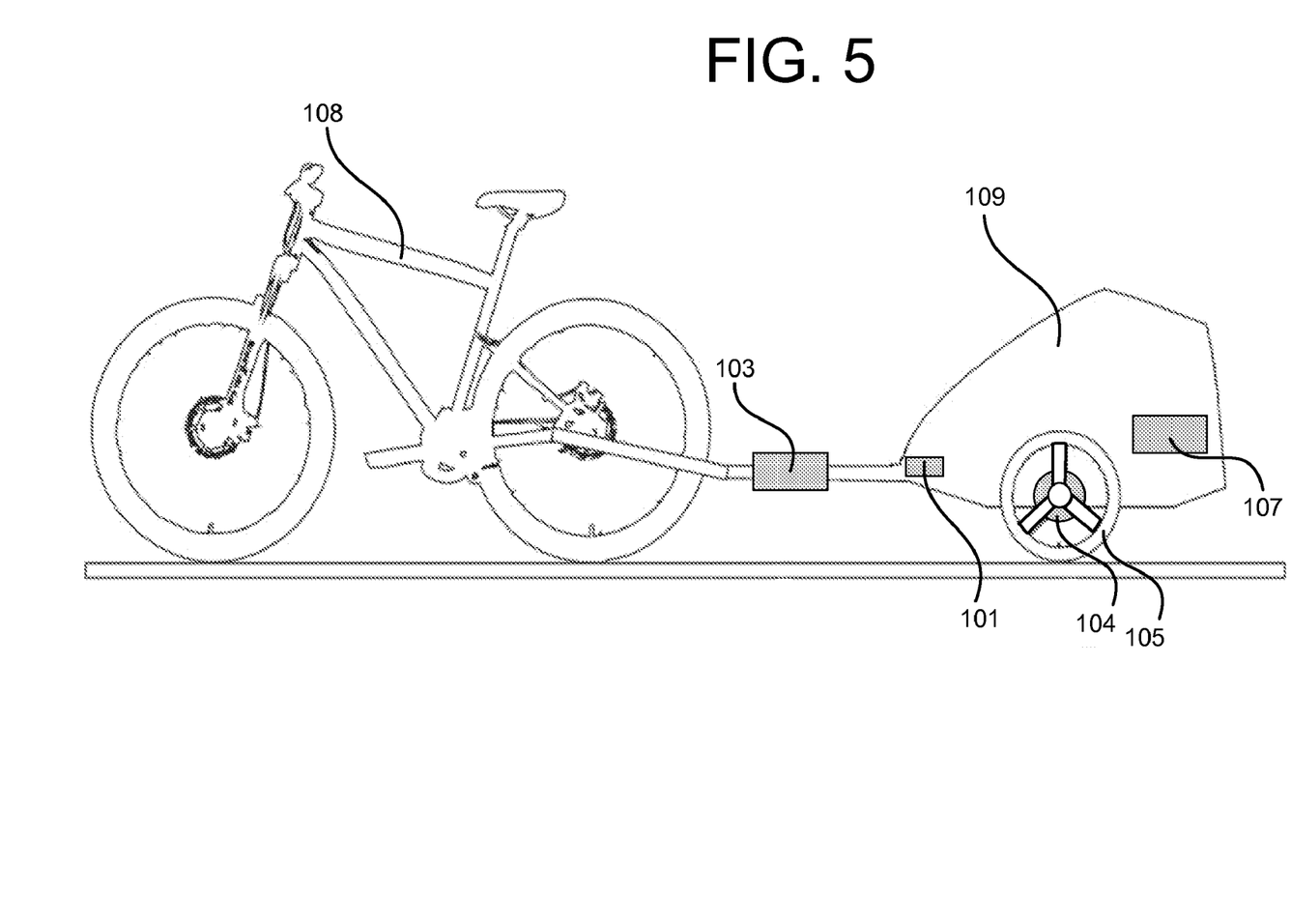
FIG. 5 shows the placement of the system components for a bicycle pulling a trailer according to an embodiment of the present invention.
Figure 6:
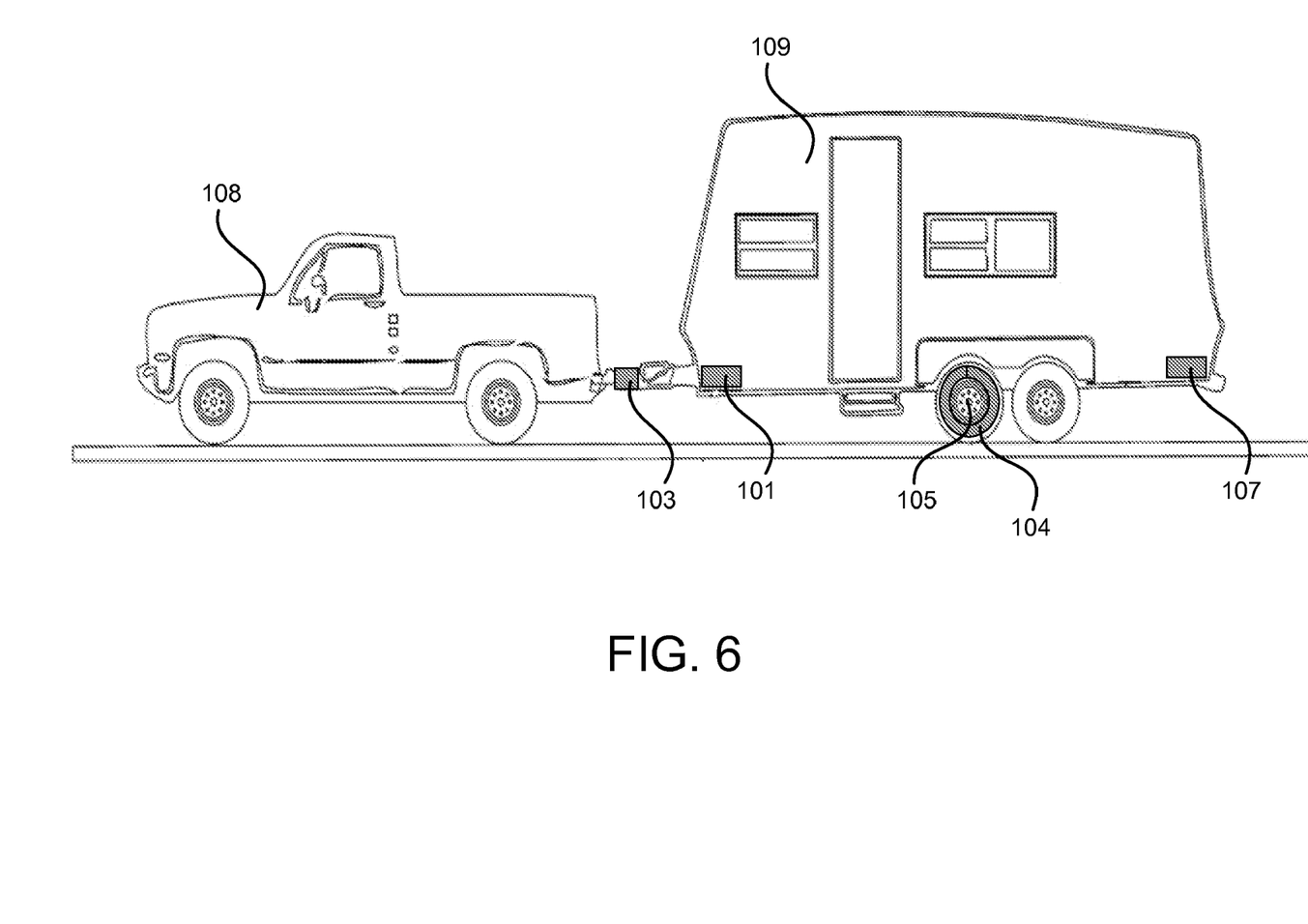
FIG. 6 shows the placement of the system components for a truck pulling a trailer according to an embodiment of the present invention.
Figure 7:
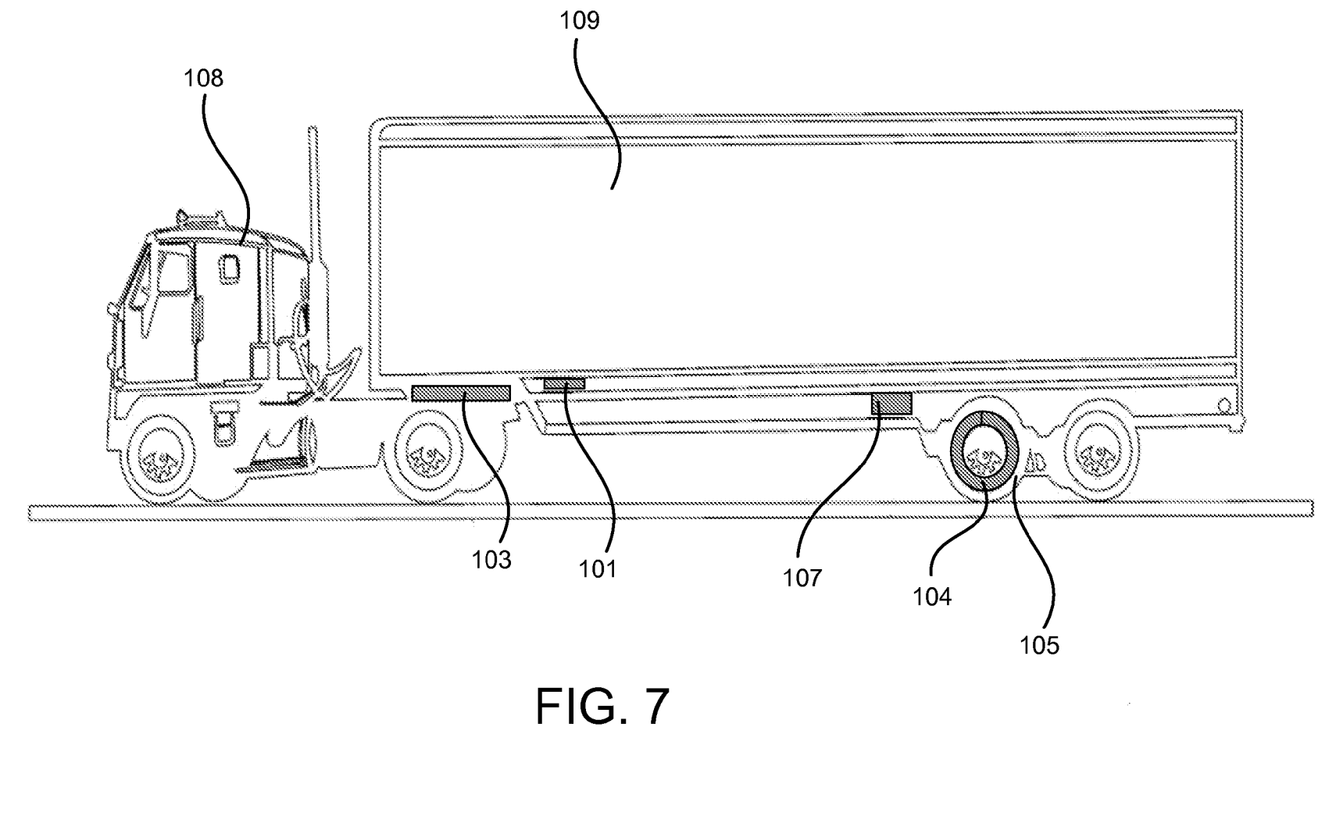
FIG. 7 shows the placement of the system components for a semi tractor pulling a trailer according to an embodiment of the present invention.

FIGS. 5-7 show the placements of the various components of the control and motor systems on the trailer for a bicycle, a truck towing a trailer and a semi tractor pulling a trailer for FIGS. 5, 6 and 7 respectively. Shown are the PID controller 101, load cell 103, electric hub motor 104, wheel 105, battery 107, towing vehicle 108 and the trailer 109.

Included in the embodiments of the present invention are a manual override of the trailer control system that may be activated from the towing vehicle and a dual charge system for the trailer batteries from both the trailer motor system and the vehicle motor.

It should be understood, of course, that the foregoing relates to exemplary embodiments of the invention and that modifications may be made without departing from the spirit and scope of the invention.

EXAMPLES

A functional prototype of the bicycle trailer application has been built to test the functionality of the invention. The trailer contains two wheels, one closed-loop controller, one electric hub motor attached to a wheel, a motor controller and a brake controller. The PID controller is a Newport PID controller provided with setting for Proportional Bandwidth, Reset, and Rate which are related to the P, I and D parameters respectively. It has been established by trial and error that the parameters that consistently maintained a zero load condition during a drive are:

Proportional Bandwidth=30 lb,
Reset=35, and
Rate=0.4

I claim:

1. A system for towing a trailer by a towing vehicle, said trailer comprising a first side containing at least one wheel and a second side containing at least one wheel, said system comprising:
   at least one electric hub motor, said each electric hub motor being adapted for turning one wheel of the trailer, said electric hub motor being powered by at least one battery disposed in the trailer;
   a towing arm assembly engaged with the trailer at one end and the towing vehicle at another end, said towing arm assembly being adapted for transmitting a mechanical load from the towing vehicle to the trailer;
   a brake system adapted for applying a breaking force to said wheel;
   a closed-loop controller disposed on the trailer, said controller being adapted for receiving and processing signals, said closed-loop controller comprising a summing junction, a logic control unit and a process controller; and
   a load measuring device mounted on the towing arm assembly, said load measuring device being adapted for measuring and summing mechanical forces, said load measuring device also being adapted for transmitting a voltage proportional to a mechanical force to the logic control unit.

2. The system of claim 1, wherein the brake system comprises mechanical brakes and regenerative brakes.

3. The system of claim 1, wherein the logic control unit of the closed-loop controller comprises a proportional calculator, a differential calculator and an integral calculator.

4. The system of claim 3, wherein the proportional calculator contains at least one preset proportional gain and a proportional algorithm, said differential calculator containing at least one preset differential gain and a differential algorithm, said integral calculator containing at least one preset integral gain and an integral algorithm.

5. The system of claim 1, wherein the process controller comprises:
   an electric hub motor controller adapted for receiving, processing and transmitting signals, said electric hub motor controller being adapted for modulating a speed of the electric hub motor;
   a brake controller adapted for receiving, processing and transmitting signals, said brake controller being adapted for modulating braking of the trailer wheels.

6. The system of claim 1 wherein the towing vehicle is a bicycle.

7. The system of claim 1, wherein the load measuring device comprises an S-type load cell having a top bar and a bottom bar.

8. The system of claim 7, wherein the towing arm assembly comprises:
   a front bar and a rear bar wherein a front portion of the front bar is engaged with the towing vehicle and wherein a rear portion of the rear bar is engaged with the trailer, said rear bar being positioned at a higher elevation relative to the front bar;
   a first plate disposed at a first side of the front bar and the rear bar and a second plate disposed at a second side of the front bar and the rear bar, said front bar being pivotally affixed to the first plate and the second plate by a front pivoting axle and by a rear pivoting axle, said first side of the rear bar being permanently affixed to the first plate, said second side of the rear bar being permanently affixed to the second plate;
   the S-type load cell being attachably mounted on a top surface of the front bar; and
   a shaft attached to a front portion of the rear bar at one end, said shaft being threadably attached to the bottom bar of the S-type load cell.

9. The system of claim 3, wherein the logic control unit comprises a PID controller.

10. A system for towing a trailer by a towing vehicle, said trailer comprising a first side and a second side, each of the first side and of the second side of the trailer comprising:
   at least one wheel;
   at least one electric hub motor, each electric hub motor being adapted for turning one wheel of the trailer, said electric hub motor being powered by at least one battery disposed in the trailer;
   a load measuring device support assembly having a front arm and a rear arm, said rear arm of the load measuring device support assembly being engaged with the trailer, said load measuring device support assembly being adapted for containing a load measuring device, said rear arm being positioned at a higher elevation relative to the front arm;
   a brake system adapted for receiving command signals and for applying a breaking force to said wheel;
   a closed-loop controller, said controller being adapted for receiving and processing signals, said closed-loop controller comprising a summing junction, a logic control unit and a process controller;
   a load measuring device mounted on the load measuring device support assembly, said load measuring device being adapted for measuring and summing mechanical loads, said load measuring device also being adapted for transmitting a mechanical force to the logic control unit;
   said system also comprising a joining bar attached at one end to the front arm of the load measuring device support assembly of the first side of the trailer, said joining bar being attached at another end to the front arm of the load measuring device support assembly of the second side of the trailer, said system also containing a hitch bar attached at one end to the joining bar and to the towing vehicle at another end.

11. The system of claim 10, wherein the load measuring device comprises an S-type load cell having a top bar and a bottom bar.

12. The system of claim 11, wherein the load measuring device support assembly further comprises:
- a first plate disposed at a first side of the front arm and the rear arm and a second plate disposed at a second side of the front arm and the rear arm, said front arm being pivotally affixed to the first plate and the second plate by a front pivoting axle and by a rear pivoting axle, said first side of the rear arm being permanently affixed to the first plate, said second side of the rear arm being permanently affixed to the second plate;
- the S-type load cell being attachably mounted on a top surface of the front arm; and
- a shaft attached to a front portion of the rear arm at one end, said shaft being threadably attached to the bottom bar of the S-type load cell.

13. The system of claim 10, wherein the logic control unit of the closed-loop controller comprises a proportional calculator, a differential calculator and an integral calculator.

14. The system of claim 10, wherein the process controller comprises:
- an electric hub motor controller adapted for receiving, processing and transmitting signals, said electric hub motor controller being adapted for modulating a speed of the electric hub motor; and
- a brake controller adapted for receiving, processing and transmitting signals, said brake controller being adapted for modulating braking of the trailer wheels.

15. The system of claim 10, wherein the brake system comprises mechanical brakes and regenerative brakes.

16. The system of claim 10, wherein the logic control unit comprises a PID controller.

* * * * *